United States Patent
Bedouet

(10) Patent No.: US 11,855,843 B2
(45) Date of Patent: Dec. 26, 2023

(54) SYSTEM AND METHOD FOR MONITORING STATUS OF NETWORK COMPONENTS IN A NETWORK CONFIGURATION

(71) Applicant: OVH, Roubaix (FR)

(72) Inventor: Olivier Jacques Henri Bedouet, Malissard (FR)

(73) Assignee: OVH, Roubaix (FR)

( * ) Notice: Subject to any disclaimer, the term of this patent is extended or adjusted under 35 U.S.C. 154(b) by 90 days.

(21) Appl. No.: 17/947,590

(22) Filed: Sep. 19, 2022

(65) Prior Publication Data
US 2023/0179483 A1    Jun. 8, 2023

(30) Foreign Application Priority Data

Sep. 21, 2021   (EP) .................................... 21306302

(51) Int. Cl.
| | | |
|---|---|---|
| *G06F 15/177* | (2006.01) | |
| *H04L 41/0869* | (2022.01) | |
| *H04L 41/0894* | (2022.01) | |
| *H04L 41/08* | (2022.01) | |

(52) U.S. Cl.
CPC ...... *H04L 41/0869* (2013.01); *H04L 41/0886* (2013.01); *H04L 41/0894* (2022.05)

(58) Field of Classification Search
None
See application file for complete search history.

(56) References Cited

U.S. PATENT DOCUMENTS

2010/0195537 A1    8/2010   Pelletier et al.
2014/0129705 A1*   5/2014   O'Brien .................. H04L 43/10
                                              709/224

(Continued)

FOREIGN PATENT DOCUMENTS

EP        3703314 A1     9/2020

OTHER PUBLICATIONS

Extended European Search Report with regard to the EP Patent Application No. 21306302.7 completed on Feb. 18, 2022.

(Continued)

*Primary Examiner* — Atta Khan
(74) *Attorney, Agent, or Firm* — BCF LLP

(57) ABSTRACT

A system and method for monitoring configuration status of a plurality of network components of a network. The method comprises generating, based on a network object model, a first configuration file indicative of expected configuration status of the plurality of network components, the network model comprising Node objects, Interface objects, evpnEdge objects and Layer objects. The method further comprises receiving a second configuration file indicative of current configuration status of the plurality of network components, the first and second configuration files comprising tagged sections and sub-sections, and comparing the first and second configuration files comprising comparing a first sub-section of the first configuration file with a corresponding second sub-section of the second configuration file based on tags of the first and second sub-sections, the first and second sub-sections comprising configuration commands relative to one of the plurality of network components.

19 Claims, 7 Drawing Sheets

(56) References Cited

U.S. PATENT DOCUMENTS

2014/0304399 A1* 10/2014 Chaudhary ......... G06F 11/3093
709/224
2015/0195178 A1* 7/2015 Bhattacharya ...... H04L 41/0895
718/1

OTHER PUBLICATIONS

Feldmann et al., "IP Network Configuration for Intradomain Traffic Engineering", IEEE Network, IEEE Service Center, New York, NY, US, vol. 15, No. 5, Sep. 1, 2001, pp. 46-57.

* cited by examiner

SYSTEM AND METHOD FOR MONITORING STATUS OF NETWORK COMPONENTS IN A NETWORK CONFIGURATION

CROSS-REFERENCE

The present application claims priority to European Patent Convention Application No. 21306302.7, entitled "System and Method for Monitoring Status of Network Components in a Network Configuration," filed on Sep. 21, 2021, the entirety of which is incorporated by reference herein.

FIELD

The present technology relates to network monitoring and more particularly monitoring status of network components in a network configuration.

BACKGROUND

Network monitoring is a critical information technology (IT) function often used by Enterprises and Service Providers, such as Infrastructure Providers that provide network devices and hardware/software capacities to their customers. Network monitoring involves watching the activities occurring on an internal network for problems related to performance, potential routing errors, communication between different network components, etc. Network monitoring is made possible due to the information generated and provided by various network components. Such information may be embedded in transmitted data referred to as "network metadata", i.e., a class of information describing activity on the network which is supplemental to the primary information traffic transmitted over the network.

More specifically, subsequently to instantiating network components according to an expected network configuration, executing network monitoring procedures may be useful to assess whether a current network configuration of a network corresponds to the expected network configuration. As such, errors of instantiation of network components may be detected and located, as well as unwanted or unregistered modifications of status of network components.

Many developed technologies attempt to address this problem by using computer-implemented monitoring platforms. Yet, these platforms do not enable the Infrastructure Provider nor its customer to obtain a location of the failing network components and/or are not suitable for identifying configuration errors in configuration files associated with the network components.

Therefore, even though the developments identified above may provide benefits, improvements are still desirable.

SUMMARY

Implementations of the present technology have been developed at least in part based on developers' appreciation of shortcomings associated with the prior art. Developers of the present technology have devised methods and systems for monitoring configuration status of a plurality of network components of a network.

In a first broad aspect of the present technology, there is provided a method for monitoring a configuration status of a plurality of network components of a network, the method comprising generating, using a network object model associating one or more instantiation objects to each one of the plurality of network components, a first configuration file indicative of an expected configuration status of the plurality of network components. The instantiation objects include Node objects representing points of interconnection in the network; Interface objects, being hierarchically inferior to the Node objects, and representing connections to points of interconnection; evpnEdge objects representing transports to/from of points of interconnection in the network; and Layer objects, being hierarchically inferior to the evpnEdge objects, and representing characteristics of the transported protocol to/from point of interconnection. The first configuration file includes one or more tagged sections, each tagged section comprising one or more tagged sub-section, the tagged sections and tagged sub-sections comprising configuration commands being respective instantiations of one of more instantiation objects and indicative of the expected configuration status of each of the plurality of network components. The method further includes receiving a second configuration file indicative of a current configuration status of the plurality of network components, the second configuration file comprising one or more tagged sections, each tagged section comprising one or more tagged sub-sections, the tagged sections and tagged sub-sections comprising configuration commands indicative of the current configuration status of each of the plurality of network components; and comparing the first and second configuration files comprising comparing a first sub-section of the first configuration file with a corresponding second sub-section of the second configuration file based on tags of the first and second sub-sections, the first and second sub-sections comprising configuration commands relative to one of the plurality of network components.

In some embodiments of the present technology, the method further includes, prior to receiving the second configuration file, transmitting configuration status queries to the plurality of network components; and generating the second configuration file based on responses to the configuration status queries from the plurality of network components.

In some embodiments of the present technology, the method further includes a setup phase prior to generating the first configuration file, the setup phase comprising receiving a user request for applying a network configuration to the network; using the network object model to describe each network component through one or more corresponding instantiation objects of the network object model; generating one or more configuration instantiating commands based on the user request, each configuration instantiating command being directed to a corresponding network component; transmitting the one or more configuration instantiating commands to a corresponding one or more network component of the plurality of network components; and executing the one or more configuration instantiating commands to apply the network configuration to the network.

In some embodiments of the present technology, the method further includes identifying, based on a result of the comparison between the first and second configuration files, incoherent configuration commands in sub-sections of the first and second configuration files, a given configuration command of a sub-section of the first configuration file being identified as incoherent if a corresponding sub-section of the second configuration file lacks the given configuration command, and a given configuration command of a sub-section of the second configuration file being identified as incoherent if a corresponding sub-section of the first configuration file lacks the given configuration command.

In some embodiments of the present technology, the method further includes causing, by the monitoring entity, an execution of the incoherent configuration commands of the first configuration file by their corresponding network components.

In some embodiments of the present technology, the method further includes causing, by the monitoring entity, an execution of corrective configuration commands discarding an incoherent configuration command of a sub-section of the second configuration file from the configuration status of the corresponding network component.

In some embodiments of the present technology, generating the first configuration file and generating the second configuration file are made in response to receiving a monitoring request by an operator of the network.

In some embodiments of the present technology, the method further includes periodically updating the second configuration file and comparing the first and second configuration file.

In some embodiments of the present technology, the network is a multi-tenant network where at least one network component of the plurality of network components supports a first service and a second service, the first and second configuration files being respectively indicative of the expected and current configuration status of the at least one network component for a given one of the first and second services.

In some embodiments of the present technology, a data format of the first and second configuration files is JSON.

In some embodiments of the present technology, a given Layer object is adapted for a Layer 2 protocol to be the transported protocol.

In some embodiments of the present technology, at least one of the one or more tagged sub-sections of the first configuration file includes one or more tagged sub-sub-sections.

In some embodiments of the present technology, at least one of the one or more tagged sub-sections of the second configuration file includes one or more tagged sub-sub-sections.

In some embodiments of the present technology, comparing the first and second configuration files includes executing a textual comparison between the first and second configuration files.

In some embodiments of the present technology, the method further includes executing the incoherent configuration commands of the first configuration file onto their corresponding network components.

In some embodiments of the present technology, the method further includes discarding an incoherent configuration command from a sub-section of the second configuration file and executing the configuration commands of the sub-section on the corresponding network component.

In some embodiments of the present technology, generating the first configuration file and generating the second configuration file are made in response to receiving a monitoring request by an operator of the network.

In some embodiments of the present technology, a given Layer object is adapted for a Layer 2 protocol to be the transported protocol.

In some embodiments of the present technology, a given Layer object is adapted for a Layer 3 protocol to be the transported protocol.

In some embodiments of the present technology, the transported protocol is an Ethernet-based protocol.

In some embodiments of the present technology, the transported protocol is IPv4.

In some embodiments of the present technology, the transported protocol is IPv6.

In a second broad aspect of the present technology, there is provided a system for monitoring a network configuration of a network comprising a plurality of network components, the system comprising a processor and a memory configured to store instructions which, upon being executed by the processor, cause the processor to generate, using a network object model associating one or more instantiation objects to each one of the plurality of network components, a first configuration file indicative of an expected configuration status of the plurality of network components, the instantiation objects comprising Node objects representing points of interconnection in the network, Interface objects, being hierarchically inferior to the Node objects, and representing connections to points of interconnection, evpnEdge objects representing transports to/from of points of interconnection in the network; and Layer objects, being hierarchically inferior to the evpnEdge objects, and representing characteristics of the transported protocol to/from point of interconnection, the first configuration file comprising one or more tagged sections, each tagged section comprising one or more tagged sub-sections, the tagged sections and tagged sub-sections comprising configuration commands being respective instantiations of one of more instantiation objects and indicative of the expected configuration status of each of the plurality of network components. The processor further receives a second configuration file indicative of a current configuration status of the plurality of network components, the second configuration file comprising one or more tagged sections, each tagged section comprising one or more tagged sub-sections, the tagged sections and tagged sub-sections comprising configuration commands indicative of the current configuration status of each of the plurality of network component, compares the first and second configuration files comprising comparing a first sub-section of the first configuration file with a corresponding second sub-section of the second configuration file based on tags of the first and second sub-sections, the first and second sub-sections comprising configuration commands relative to one of the plurality of network components, identifies, based on a result of the comparison between the first and second configuration files, incoherent configuration commands in sub-sections of the first and second configuration files, a given configuration command of a sub-section of the first configuration file being identified as incoherent if a corresponding sub-section of the second configuration file lacks the given configuration command, and a given configuration command of a sub-section of the second configuration file being identified as incoherent if a corresponding sub-section of the first configuration file lacks the given configuration command, and causes, by employing a monitoring entity, an execution of the incoherent configuration commands of the first configuration file by their corresponding network components.

In some embodiments of the system, the processor is further configured to, prior to receiving the second configuration file, transmit configuration status queries to the plurality of network components; and generate the second configuration file based on responses to the configuration status queries from the plurality of network components.

In some embodiments of the system, the processor is further configured to execute a setup phase prior to generating the first configuration file, the setup phase comprising receiving a user request for applying a network configuration to the network, using the network object model to describe each network component through one or more corresponding instantiation objects of the network object model, generating one or more configuration instantiating commands based on the user request, each configuration instantiating command being directed to a corresponding network component, transmitting the one or more configuration instantiating commands to a corresponding one or more network component of the plurality of network components; and causing execution the one or more configuration instantiating commands to apply the network configuration to the network.

In some embodiments of the system, the processor is further configured to cause, by employing the monitoring entity, an execution of corrective configuration commands discarding an incoherent configuration command of a sub-section of the second configuration file from the configuration status of the corresponding network component.

In some embodiments of the system, generating, by the processor, the first configuration file and generating the second configuration file are made in response to receiving a monitoring request by an operator of the network.

In some embodiments of the system, the processor is further configured to cause an automatic and periodical update of the second configuration file and compare the first and second configuration file upon receiving an updated second configuration file.

In some embodiments of the system, the network is a multi-tenant network where at least one network component of the plurality of network components supports a first service and a second service, the first and second configuration files being respectively indicative of the expected and current configuration status of the at least one network component for a given one of the first and second services.

In some embodiments of the system, a data format of the first and second configuration files is JSON.

In some embodiments of the system, at least one of the one or more tagged sub-sections of one or more of the first and second configuration files comprises one or more tagged sub-sub-sections.

In the context of the present specification, a "server" is a computer program that is running on appropriate hardware and is capable of receiving requests (e.g., from administrator devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "user device" is any computer hardware that is capable of running software appropriate to the relevant task at hand. Thus, some (non-limiting) examples of user devices include personal computers (desktops, laptops, netbooks, etc.), smartphones, and tablets, as well as network equipment such as routers, switches, and gateways. It should be noted that a device acting as a user device in the present context is not precluded from acting as a server to other user devices. The use of the expression "a user device" does not preclude multiple user devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "dataset" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, a "network", or "computer network", is intended to include a configuration of devices and software that are in mutual communication and can exchange information, including data and instructions. Such communication is accomplished by the presence of a direct physical connection between devices (i.e., wired communication) and/or indirectly by electromagnetic or other non-physically connected communication (i.e., wireless communication), using whatever protocols are extant between the two devices. A network can include arbitrary numbers and types of devices, systems, and applications, which, in some exemplary, illustrative, non-limiting embodiments, function in accordance with established policies. In some networks, the network components, systems and applications included in the network can change over time, as can their configurations, locations and other parameters as devices are connected or disconnected from the network whether purposely or inadvertently.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a data object with respect to a particular object storage device, or some other means of directing the recipient of the indication to a network location, memory address, database table, or other location where the data object may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
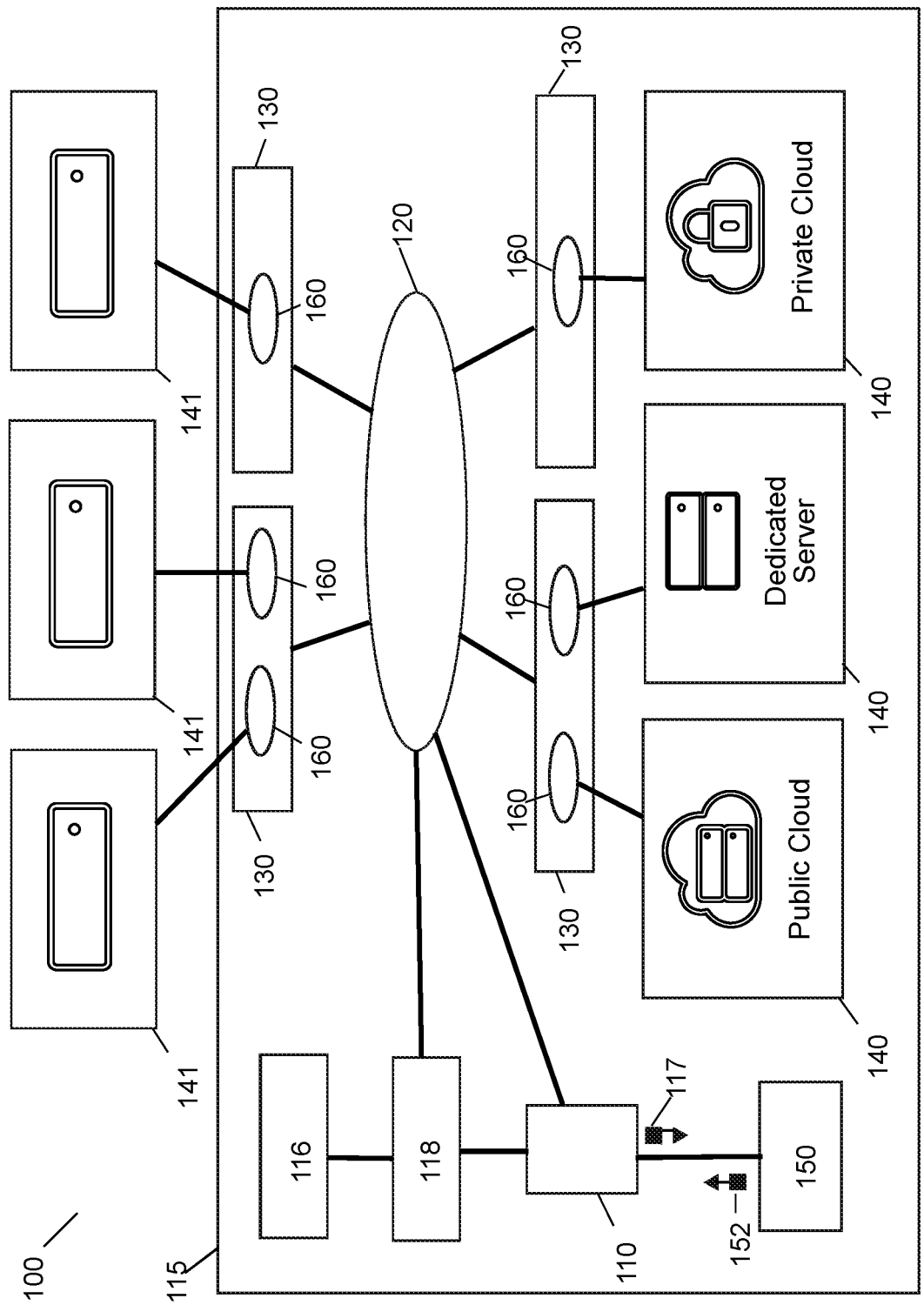
FIG. 1 is a schematic diagram of a system for monitoring configuration status of a plurality of network components of a network in accordance with an implementation of the present technology.

It should also be noted that, unless otherwise explicitly specified herein, the drawings may not be drawn to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes that may be substantially represented in non-transitory computer-readable media and so executed by a computer or processor, whether or not such computer or processor is explicitly shown.

The functions of the various elements shown in the figures, including any functional block labeled as a "processor" or "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some implementations of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

It is to be expressly understood that the FIGS. 1 to 7 merely depict illustrative implementations of the present technology. Thus, the description thereof that follows is intended to be only a description of illustrative examples of the present technology. In some cases, what are believed to be helpful examples of modifications to the present technology may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the present disclosure may provide in certain instances simple implementations of the present technology, and that where such is the case they have been presented in this manner as an aid to understanding. As persons skilled in the art would understand, various implementations of the present technology may be of a greater complexity.

With these fundamentals in place, we will now consider some non-limiting examples to illustrate various implementations of aspects of the present technology.

In one aspect, the present technology provides systems and methods for monitoring a network and identifying differences between a current network configuration of the network and an expected network configuration. As such, the present technology enables identification of unwanted and/or unregistered modifications in the configuration status of the network components of the network. In a non-limiting embodiment of the present technology, the network is modelled as a network object model wherein each network component is modelled through instantiation objects having different parameters indicative of a configuration status of the network component. A first and a second configuration files are generated and indicative of an expected and a current network configuration of the network respectively. The first configuration file may be generated based on the network object model. The network components may be caused, upon request by a monitoring entity, to generate configuration description file to be transmitted to the monitoring entity to further generate the second configuration file. A comparison procedure is further executed between the first and second configuration files to identify the differences between the current network configuration of the network and the expected network configuration.

Referring to FIG. 1, there is shown a schematic diagram of a system 100, the system 100 being suitable for implementing non-limiting embodiments of the present technology. Broadly speaking and as an example, the system 100 may be employed for providing network configuration monitoring functionalities. To that end, the system 100 includes inter alia a monitoring entity 110, a communication network 120, and a plurality of network components 130 such as routers or switches. As such, any system variation configured to enable network configuration monitoring can be adapted to execute embodiments of the present technology, once teachings presented herein are appreciated. In the context of the present disclosure, the network components 130 are interconnected via the communication network 120 and form a network having a given current network configuration, each network component 130 having a corresponding current status, or "configuration". The current network configuration of the network is representative of a physical architecture and a virtual architecture of the network.

For example, in a non-limiting embodiment, the network components 130 may physically belong to an Infrastructure Provider 115 and be used to provide one or more services for one or more corresponding clients of the Infrastructure Provider 115. Clients of the Infrastructure Provider 115 may use resources inside network tenants 140 such as Public Cloud instances, Dedicated Servers or Private Cloud environments or the like. Clients may also use resources 141 outside of Infrastructure Provider 115 such as resource servers, routers, endpoints (e.g. laptops or cellphones) or the like. In this embodiment, the Infrastructure Provider 115 operates the monitoring entity 110. More specifically, in this embodiment, the system 100 may be defined in a multi-tenant environment such that at least one network component 130 (e.g. a resource server) provides services 160 for a plurality of clients of the Infrastructure Provider 115. Clients define individually each desired service 160 by interaction with an application frontend 116 which activates a non-limited list of tasks to an automation layer 118. In use, the automation layer 118 instructs network components 130 to configure the one or more desired services 160. Automation layer 118 may use a network model described, for instance, in the European Patent No. EP3703314A1, published on Sep. 2, 2020, the entirety of which is incorporated by reference herein.

With respect to FIG. 1, the monitoring entity 110 is communicably connected to administrator devices 150 (only one of which being depicted in FIG. 1 for simplicity), each administrator device 150 being associated with a corresponding administrator of the Infrastructure Provider 115. As an example, a given administrator may be a client of the Infrastructure Provider 115 that may use the network components 130 for his/her own clients. Even though the monitoring entity 110 and the administrator device 150 are depicted as being in direct communication on FIG. 1, it is contemplated that they may be communicably connected via the communication network 120, or any other communication network suitable to communicably connect to administrator device 150 to the monitoring entity, in alternative embodiments. The monitoring entity 110 functionalities may be provided by a controller 600 (see FIG. 6). As will be described in greater details below, a given administrator may transmit, in use and via its corresponding administrator device 150, a monitoring request 152 to the monitoring entity 110 to receive, in return, information 117 about a network configuration of the specific network components 130 providing services for that administrator. Some functionality of components of the system 100 will now be described in greater detail.

Communication Network

In one non-limiting example, the communication network 120 may be implemented as the Internet. In other non-limiting examples, the communication network 120 or portion thereof may be implemented differently, such as any wide-area communication network, local-area communication network, a private communication network and the like. In fact, how the communication network 120 is implemented is not limiting and will depend on inter alia how other components of the system 100 are implemented.

The purpose of the communication network 120 is to communicatively couple at least some of the components of the system 100 such as the plurality of network components 130 and the monitoring entity 110. For example, this means that the plurality of network components 130 is accessible via the communication network 120 by the monitoring entity 110.

The communication network 120 may be used in order to transmit data packets amongst the plurality of network components 130 and the monitoring entity 110. For example, the communication network 120 may be used to transmit, from the monitoring entity 110 configuration status queries for receiving information about configuration of a given one or more of the network components 130 and/or configuration instructions for instantiating the given one or more of the network components 130. As another example, the communication network 120 may be used to transmit, from a given one or more network components 130 to the monitoring entity 110, information about a current configuration of the given one or more of the network components 130.

Network Components

As mentioned above, the plurality of network components 130 may be routers or switches. A given one of the pluralities of network components 130 may be implemented as Arista running EOS, for example. Each network component 130 includes a memory or is communicatively connected thereto, said memory storing data including information about the current configuration status of the corresponding network component 130. The plurality of network components 130 may be accessed for the purpose of configuration tasks, including but not limited to, by methods such as SSH, HTTP or HTTPS. Any of the methods can imply the use of direct commands or encapsulating commands within headers or equivalent through the use of an Application Programming Interface (API). The plurality of network components 130 may imply the use of various network protocols, without limitation, such VxLAN or MPLS. The use of such protocols enables configuration of the network services 160 individually for each client associated to their network tenants 140. Such network services 160 can provide network connectivity based on OSI Layer 2 or OSI Layer 3.

Each network service 160 is individually configured. In other words, there are no dependencies between two distinct network services 160. A given network service 160 may be created, updated or deleted at any time without impact on others network services 160. The configuration that forms a network service is based on client's instructions to the Infrastructure Provider 115, said instructions may include, without being limited to, information about: IP address, vlan tag, BGP AS Number or IP Route. Based on adjustment and customization of each network services based on the client's instructions, the network configuration may not be suitably compared to a single configuration template, given that variability of the instructions (i.e. configuration commands) is up to the network complexity of the network tenants 140 associated with the client.

Monitoring Entity

In this embodiment, the monitoring entity 110 is a cluster of servers (only one of which is represented in FIG. 1 for simplicity) of the Infrastructure Provider. As such, functionalities of the monitoring entity 110 are distributed on multiple servers. In an example of an embodiment of the present technology, a given one of the servers of the cluster of servers may be implemented as a Dell™ PowerEdge™ server running the Microsoft™ Windows Server™ operating system. The monitoring entity 110 may be implemented in any other suitable hardware and/or software and/or firmware or a combination thereof.

Generally speaking, the monitoring entity 110 is under control and/or management of the Infrastructure Provider that may receive queries from the administrator devices 150. For example, the monitoring entity 110 may receive a monitoring request 152 (see FIG. 1) from a given administrator device 150 indicative of a query submitted by a corresponding administrator. The monitoring entity 110 may perform a network configuration search responsive to the submitted query for generating information about a current network configuration of network components of the network that are associated with the given client. In this embodiment, said information includes error identification between expected network configuration and current network configuration of the network components. The monitoring request 152 may also be automatically and periodically generated by the monitoring entity 110 itself such that potential errors between an expected network configuration and the current network configuration of the network components are automatically and periodically identified.

More specifically, in use, the administrator device 150 may transmit, in response to instructions from a given client of the Infrastructure Provider 115, a request for instantiating a virtual architecture of a group of network components according to an expected network configuration. For example, the expected network configuration may include expected status of given resource servers 130, expected status of communication links between given resource servers 130 or the like (e.g. configurations for different layers of the Open Systems Interconnection model (OSI model) for network components).

Generally speaking, instantiation objects and classes are defined for each network component 130 to cover all information required to deploy and describe a network configuration. More specifically, in this embodiment, each network component 130 is represented as a set of instantiation objects in an object model, or "network model" 300 (see FIG. 3), maintained by the monitoring entity 110, the network model 300 being thus indicative of a network configuration of the network. As such, upon instantiating a given network component 130, the monitoring entity 110 may generate one or more new instantiation objects or update information of existing instantiation objects representative of characteristics of the given network component in the network model 300. It should be understood that the expected network configuration and the current network configuration may be generated and further compared based on the network model 300. The network model 300 may be for example, the model described in the European patent No.

In a non-limiting embodiment, four instantiation object types are modelled in the network model 300:
- a Node object representing a point of interconnection in the network (e.g. a server, a router, an endpoint or the like);

an Interface object, being hierarchically inferior to the Node object, and representing a connection to a point of interconnection;

an evpnEdge object representing the transport to/from of a point of interconnection in the network; and a Layer object, being hierarchically inferior to the evpnEdge object, and representing the characteristics of a transported protocol to/from a point of interconnection.

Each instantiation object of the network model 300 may be instantiated with a specific set of configuration commands indicative of the expected configuration status of the network component 130 that they model. In a non-limiting embodiment, a given Layer object may be instantiated such that a Layer 2 protocol is the transported protocol, and a given Layer object instantiated such that a Layer 3 protocol is the transported protocol. For example, a transported Layer 2 protocol may be any Ethernet-based protocol (e.g. IEEE 802.1q header), and a transported Layer 3 protocol may be the IPv4 protocol or the IPv6 protocol.

In this embodiment, the monitoring entity 110 is configured to communicate with the network components 130 accessible via the communication network 120 and to retrieve configuration description files therefrom for further use, as it will be described below. To do so, in a non-limiting embodiment, the monitoring entity 110 includes an Application Programming Interface (API) that may be indirectly executed from a given administrator device 150 upon transmitting the monitoring request 152 to the monitoring entity 110. In another non-limiting embodiment, the monitoring entity 110 may be configured to autonomously retrieve the configuration description files at a pre-determined frequency such that errors in the network configuration of the network may be regularly monitored and autonomously detected.

Figure 2:
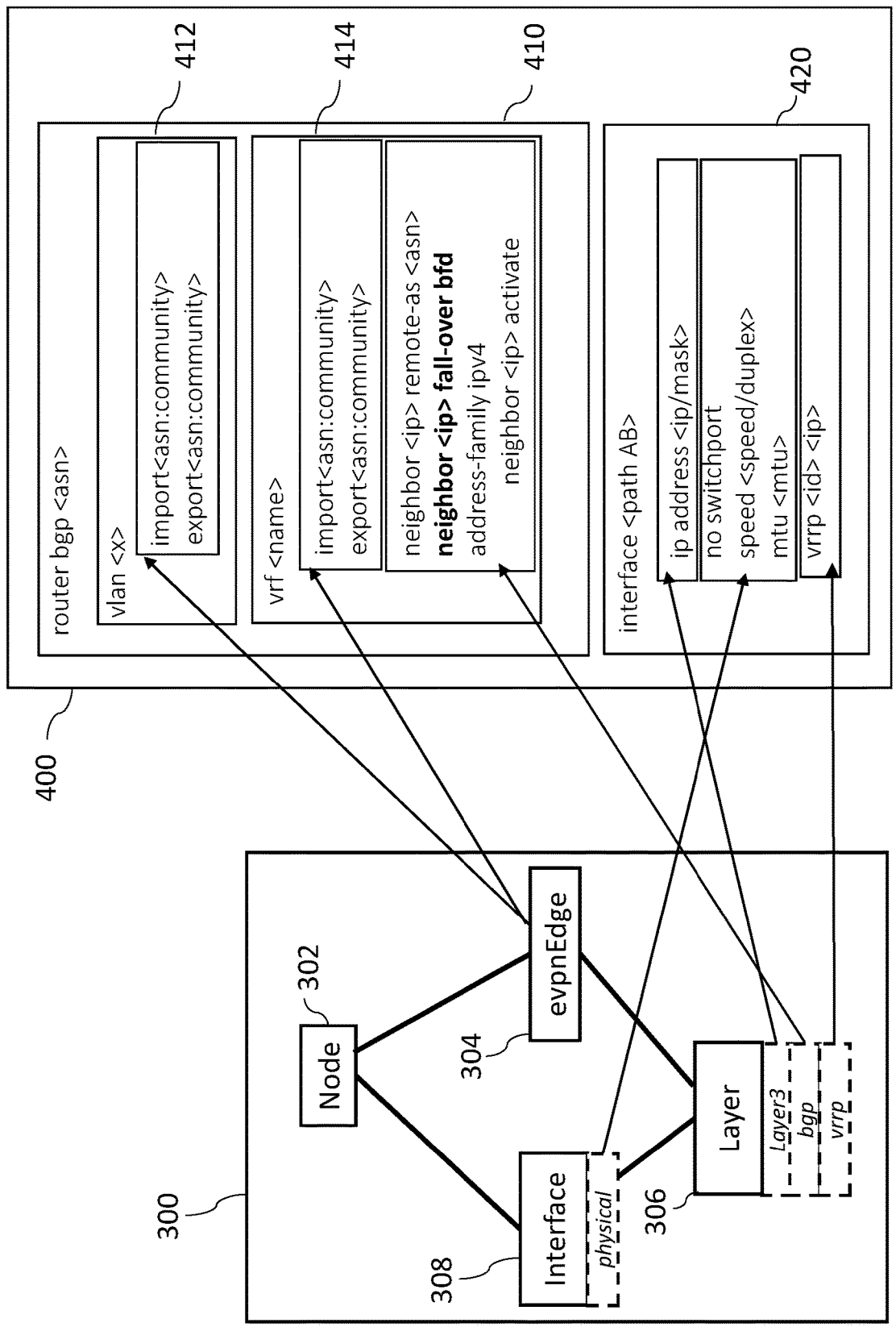
FIG. 2 is a schematic representation of a communication between a monitoring entity and an endpoint of the network in accordance with an implementation of the present technology.

With reference to FIG. 2, the monitoring entity 110 is configured to generate a reference configuration file 400 based on the network model 300, the reference configuration file 400 being thus representative of the expected configuration status of the network components 130. In this embodiment, the reference configuration file 400 includes a plurality of sections, such as sections 410 and 420, comprising sub-sections. In the illustrative example of FIG. 2, the section 410 includes two sub-sections 412 and 414. In this embodiment, the sections and sub-sections of the reference configuration file 400 include configuration commands being respective instantiation commands (or simply "instantiations") of one of more instantiation objects of the network model 300 and indicative of the expected configuration status of each of the plurality of network components 130. More specifically, in this embodiment and upon generation of the reference configuration file 400, each section and sub-section of the reference configuration file 400 is populated with instantiations of instantiation objects of the network model 300. As an example, in the illustrative example of FIG. 2, a given Interface object 308 is instantiated as "physical" (other instantiations for Interface objects are contemplated such as, without limitation, "aggregate", "loopback", "SVI"). Also in the in the illustrative example of FIG. 2, a given Layer object 306 is instantiated as "Layer3", being itself instantiated as "bgp" and "vrrp". Such instantiations generate specific sets of instantiation commands in the reference configuration file 400. As such, the section 420 is populated with instantiations of the given instantiation Layer object 306 and instantiations of the given instantiation Interface object 308. In this illustrative example, given the fact that the Interface Object 308 is instantiated as "physical", the section 420 is populated with a corresponding specific set of instantiation commands: no switchport/speed <speed/duplex>/mtu <mtu>. In the event of the Interface object 308 being instantiated as "aggregate", the section 420 may be populated with a different set of instantiation commands.

The sections and sub-sections of the reference configuration file 400 may have a respective identifier (e.g. a tag) indicative of which instantiation objects and/or which one or more network components they derive from.

In this embodiment, the reference configuration file 400 is generated as a JSON file, but other data formats are contemplated in alternative embodiments of the present technology. In one embodiment, a given sub-section of the reference configuration file 400 may also include one or more sub-sub-sections and so forth. In the context of the present description, characteristics of the sections may be also valid for sub-sections, sub-sub-sections and so forth.

How the sections and sub-sections are defined and populated is not limiting and will depend on inter alia which type of instantiation objects is described in the network model 300. In this embodiment, the monitoring entity 110 generates the reference configuration file 400 according to a pre-defined template. As such, the pre-defined template defines the sections and sub-sections to be generated by the monitoring entity 110 based on the types of instantiation objects described in the network model 300. A process for populating the sections and sub-sections may be predetermined by computer-readable instructions that may be retrieved by the monitoring entity 110. In the illustrative embodiment of FIG. 2, instantiations of a plurality of instantiation objects in the network model 300 may be used to populate a given section and/or sub-section of the reference configuration file 400.

Figure 3:
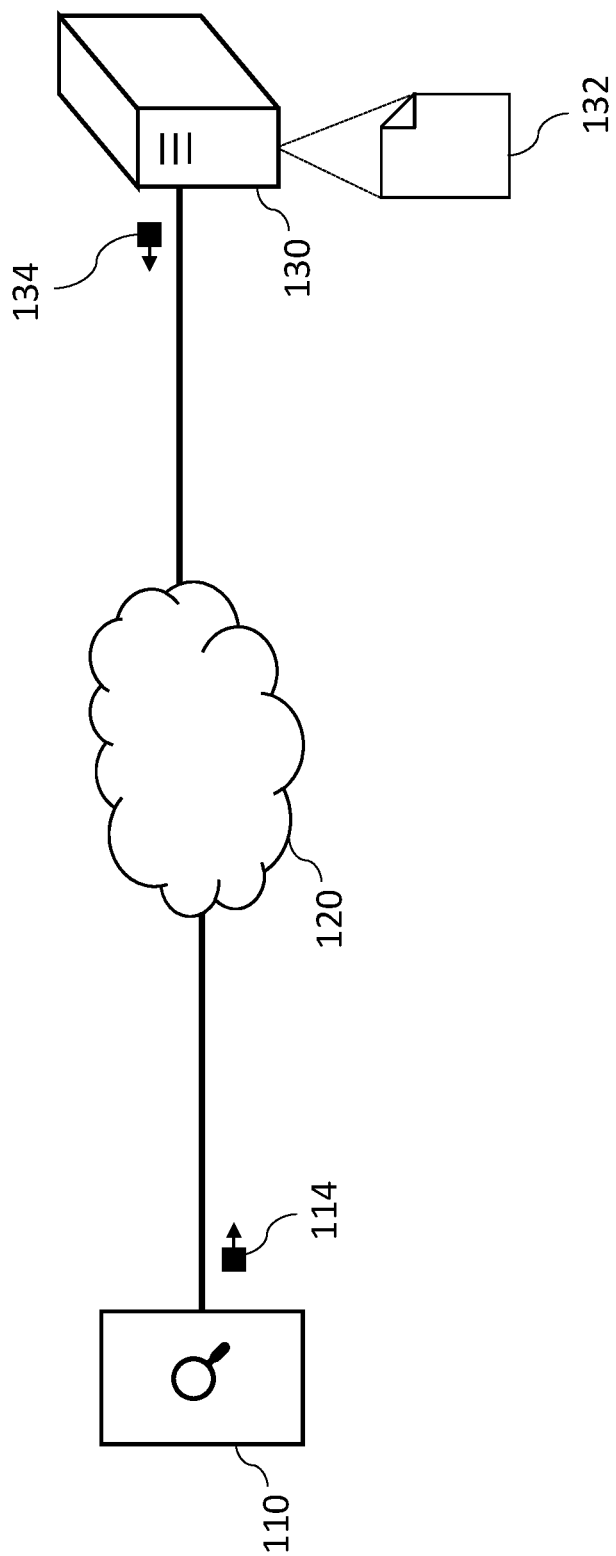
FIG. 3 is a schematic representation of a generation of a configuration file based on a network model in accordance with an implementation of the present technology.

With reference to FIG. 3, the monitoring entity 110 transmits a configuration status query 114 to one or more of the network component 130 (only one of which is depicted in FIG. 2 for simplicity) over the communication network 120. Upon reception of the configuration status query 114, the network component 130 is configured to generate a configuration description file 134 based on the data comprising information about its current configuration status. In this embodiment, said data is included in object parameters 132 associated with the network component 130. The object parameters 132 may have been, for example and without limitation, generated upon an instantiation of the network component 130 and stored in a memory of the network component 130. The configuration description file 134 is further transmitted from the network component 130 to the monitoring entity 110 such that a current configuration file 350 (see FIG. 4) is received by the monitoring entity 110. As such, in this embodiment, the monitoring entity receives the current configuration file 350 in response to having transmitted the configuration status query 114 to the network components 130.

As an example and without limitation, the configuration status query 114 may be transmitted by executing the following command on ARISTA' command-line interface (CLI) or on ARISTA™ EOS API (eAPI) such that the current configuration file 350 is received by the monitoring entity 110:

show running|json

Figure 4A:
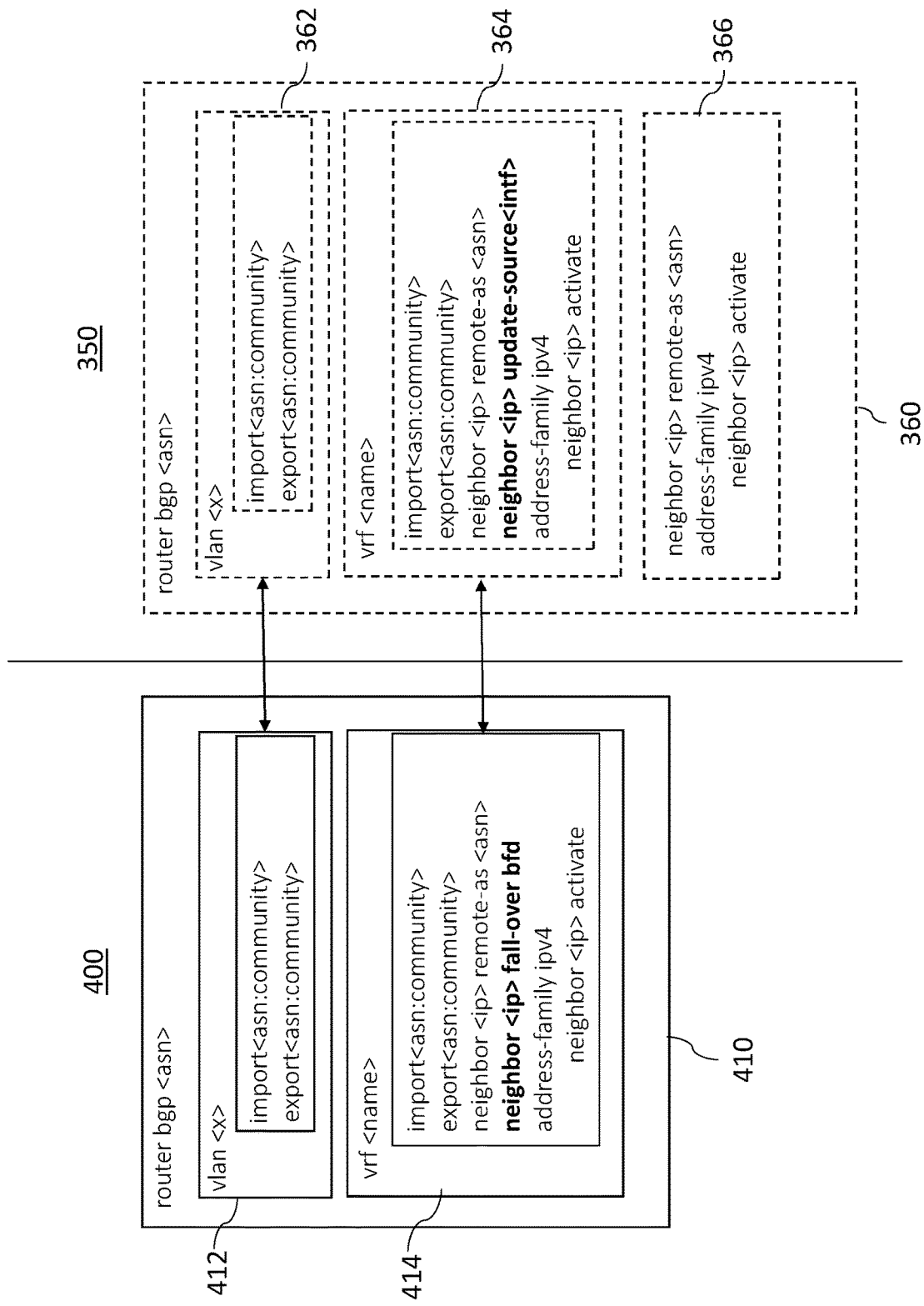
FIGS. 4a and 4b are schematic representations of comparisons between the configuration file of FIG. 3 and a reference configuration file in accordance with an implementation of the present technology.
Figure 4B:
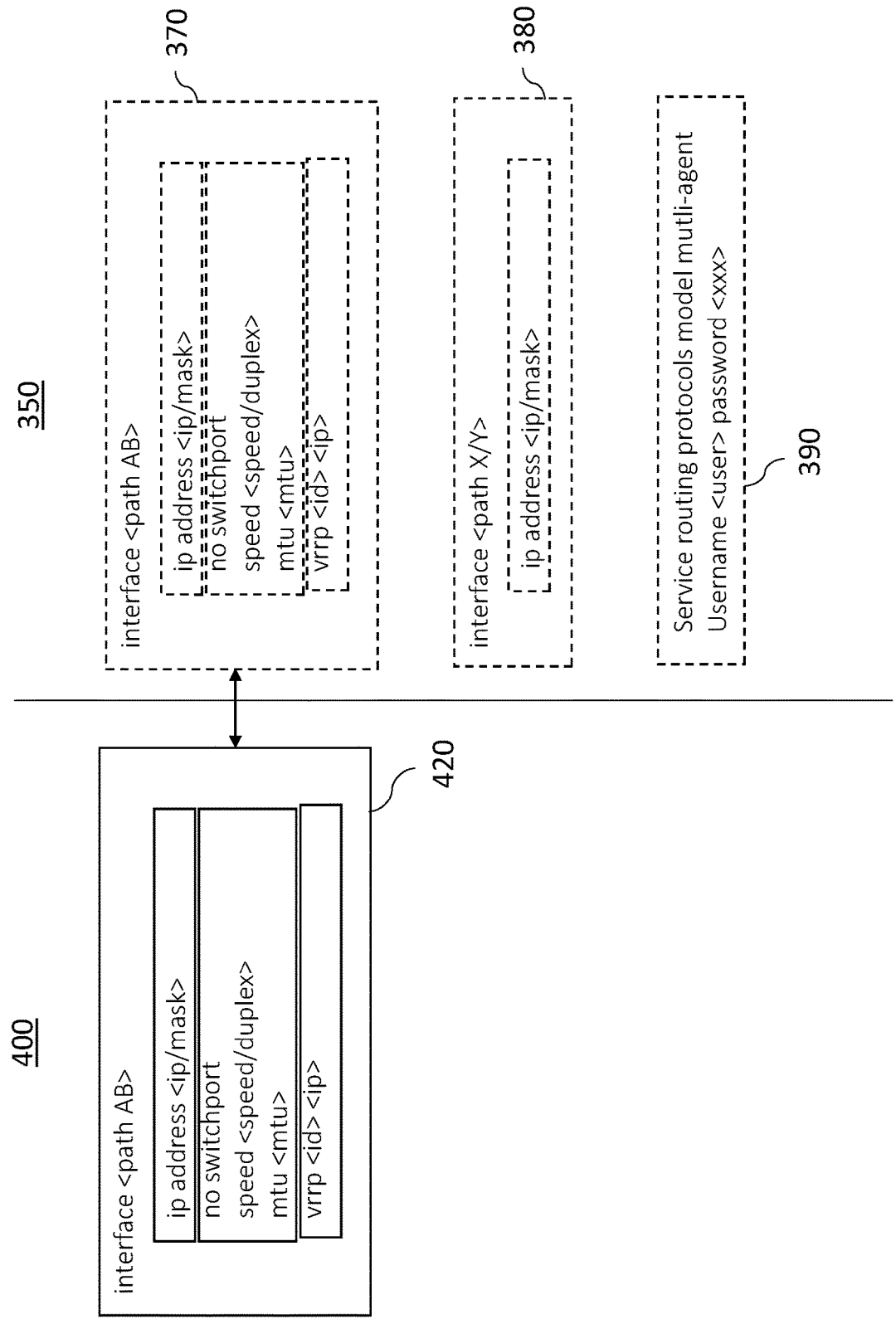

As best shown in FIGS. 4a and 4b, in this embodiment, the received current configuration file 350 includes a plurality of sections, such as sections 360 and 370, and sub-sections, such as sub-sections 362 and 364 describing the current configuration of each network component 130. In this embodiment, the current configuration file 350 is generated as a JSON file, but other data formats are contemplated in alternative embodiments of the present technology. In one embodiment, a given sub-section of the current configuration file 350 may also include one or more sub-sub-sections and so forth.

How the sections and sub-sections are defined and populated is not limiting and will depend on inter alia which type of configuration status query 114 is transmitted to the network component 130 and/or which type of configuration description file 134. In one embodiment, it an be said that a structure (i.e. sections and sub-sections) of the reference configuration 400 are set according to a pre-determined template such that said structure matches a structure of the received current configuration file 350. The sections and sub-sections of the current configuration file 350 may have a respective identifier (e.g. a tag) indicative of which one or more network components they derive from.

The monitoring entity 110 may further compare the current configuration file 350, representative of the current network configuration, to the reference configuration file 400, representative of the expected network configuration. The monitoring entity 110 may be configured to execute a text comparison procedure between sections and sub-sections of the current configuration file 350 and the reference configuration file 400. More specifically, given that each section of the current configuration file 350 and the reference configuration file 400 is associated with a given network component 130, the monitoring entity 110 may be configured to execute the text comparison procedure between a first section and a second section related to a same network component 130, the first and second sections being included in the current configuration file 350 and the reference configuration file 400 respectively.

In this embodiment, comparing texts of the first and second sections may include comparing each sub-section of the first section of the current configuration file 350 with a corresponding sub-section of the second section of the reference configuration file 400. For example, as illustrated in FIG. 4a, the section 360 is tagged and describes a configuration status of a router Border Gateway Protocol (BGP) and includes three sub-sections 362, 364 and 366. The monitoring entity 110 is configured to identify, in the reference configuration file 400 the section 410 corresponding to the router BGP and further execute the text comparison procedure. Based on an identification of said sub-sections (e.g. using tags based on characteristics of the router BGP such as vxlan<x> and vrf<name>), the monitoring entity 110 may compare instructions included in said sub-sections. As such, in this example, instructions included in the sub-section 412 are compared with instructions included in the sub-section 362. Similarly, instructions included in the sub-section 414 are compared with instructions included in the sub-section 364. In this embodiment, each section and sub-section of the current configuration file 350 and the reference configuration file 400 may be associated with an identifier indicative of a network component that they describe and characteristics thereof. As such, each section and sub-section of the current configuration file 350 may have a unique identifier (e.g. a tag) and each section and sub-section of the reference configuration file 400 may have a unique identifier. One section (or sub-section) of the current configuration file 350 may have a same identifier that a section (or sub-section) of the reference configuration file 400, such that the monitoring entity 110 may compare the two sections (or sub-sections).

In this embodiment, if determination is made that a section of the current configuration file 350 does not correspond to any sections of the reference configuration file 400, said section may be ignored in the text comparison procedure. Similarly, if determination is made that sub-section of a given section of the current configuration file 350, the given section corresponding to a section of the reference configuration file 400, does not correspond to any sub-section of the section of the reference configuration file 400, said sub-section is ignored in the text comparison procedure. For example, in the illustrative example of FIGS. 4a and 4b, the sub-sections 366 and the sections 380, 390 do not correspond to a sub-section of the section 410 and sections respectively of the reference configuration file 400. As such, the sub-section 366 may be identified as being an additional sub-section with respect to the reference configuration file 400, and the sections 380, 390 may be identified as being additional sections with respect to the reference configuration file 400.

Upon comparing two sub-sections, the monitoring entity 110 may identify incoherent configuration commands, namely "additional" configuration commands and "missing" configuration commands. More specifically, additional configuration commands may be defined as configuration commands that are present in a sub-section of the current configuration file 350 but absent from a corresponding sub-section of the reference configuration file 400. Missing configuration commands may be defined as configuration commands that are present in a sub-section of the reference configuration file 400 but absent from a corresponding sub-section of the current configuration file 350. In the illustrative example of FIG. 4a, upon comparing the sub-section 414 with the sub-section 364, the configuration command of the sub-section 414 neighbor <ip> fall-over bfd is identified as a missing configuration command, and the configuration command of the sub-section 364 neighbor <ip> update-source <intf> is identified as an additional configuration command. In a non-limiting embodiment, the monitoring entity 110 may generate a list of the incoherent configuration commands, along with their respective sub-section and sections identifiers such that an operator of the monitoring entity 110 may be provided with locations of the additional and missing configuration commands in the current configuration file 350 and the reference configuration file 400 respectively. As such, network components 130 whose sections in the current configuration file 350 differ from corresponding sections in the reference configuration file 400 may be identified as failing network components.

In one embodiment, the monitoring entity 110 may further update the network configuration (e.g. configuration status of the network components 130) based on the identified additional configuration commands and the missing configuration commands. More specifically, configuration commands may be applied by the monitoring entity 110 on one or more of the network components 130 such that the current network configuration matches the expected network configuration. In this embodiment, the monitoring entity 110 may, in response to identifying a missing configuration command in a given sub-section of the reference configuration file 400, the given sub-section corresponding to a given network component 130, cause the network component 130 to execute the missing configuration command.

In the same or another embodiment, the monitoring entity 110 may, in response to identifying an additional configuration command in a given sub-section of the current configuration file 350, the given sub-section corresponding to a given network component 130, cause the network component 130 to execute corrective configuration commands that, upon being executed, cause the configuration status of the network component 130 to match a configuration status described by the other configuration commands of the sub-section without the additional configuration command. As an example and without limitation, in response to identifying the configuration command neighbor <ip> update-source <intf> as an additional configuration command, the monitoring entity 110 may execute the following corrective configuration command: NO neighbor <ip> update-source <intf. In other words, it can be said that the additional configuration command is discarded from the sub-section, and that configuration the missing configuration command. How the corrective configuration commands are defined based on the additional configuration commands is not limiting and will depend on inter alia a type and/or a programming language of configuration command.

Figure 5:
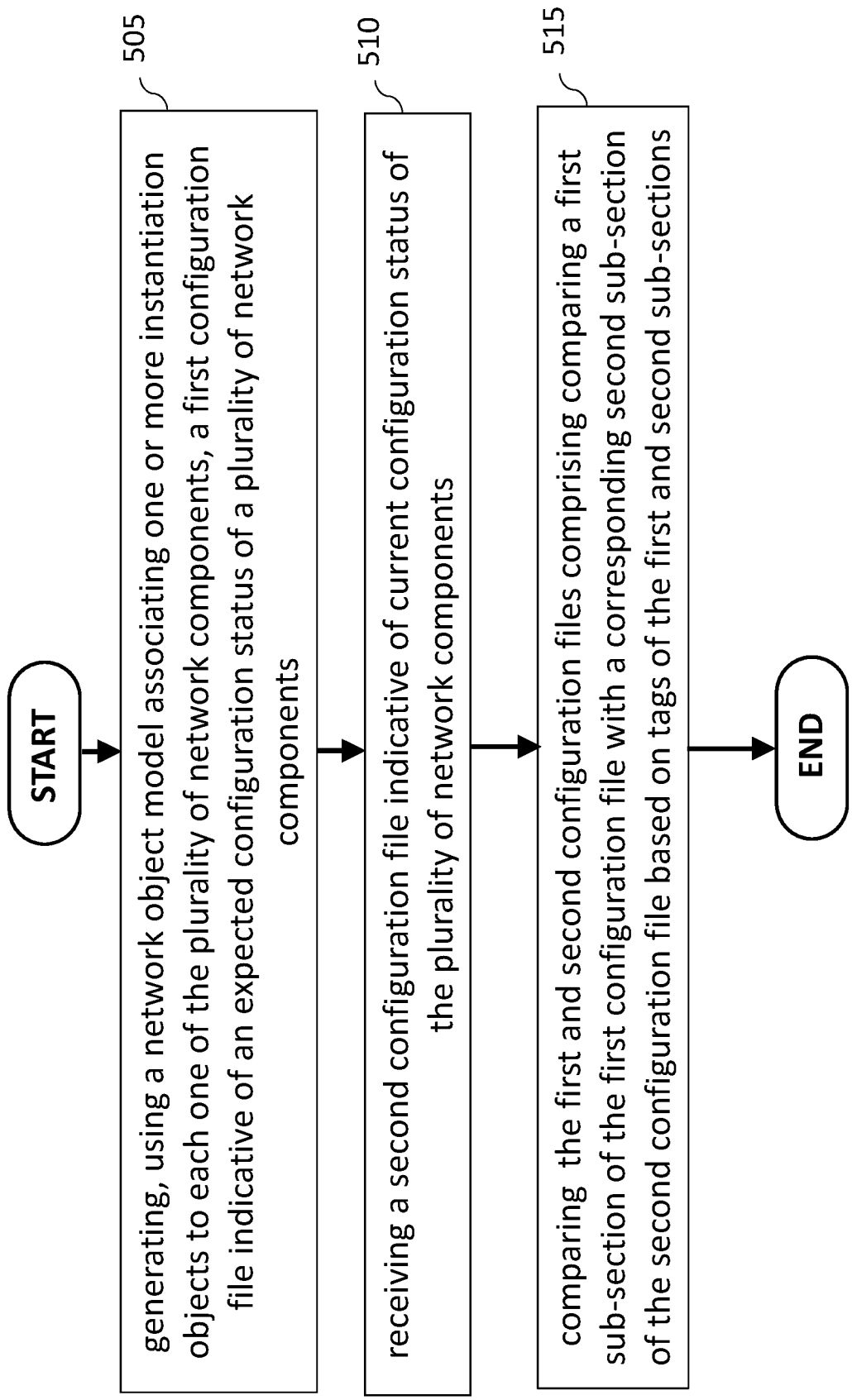
FIG. 5 is a flow diagram of a method for monitoring configuration status of a plurality of network components of a network in accordance with an implementation of the present technology.
Figure 6:
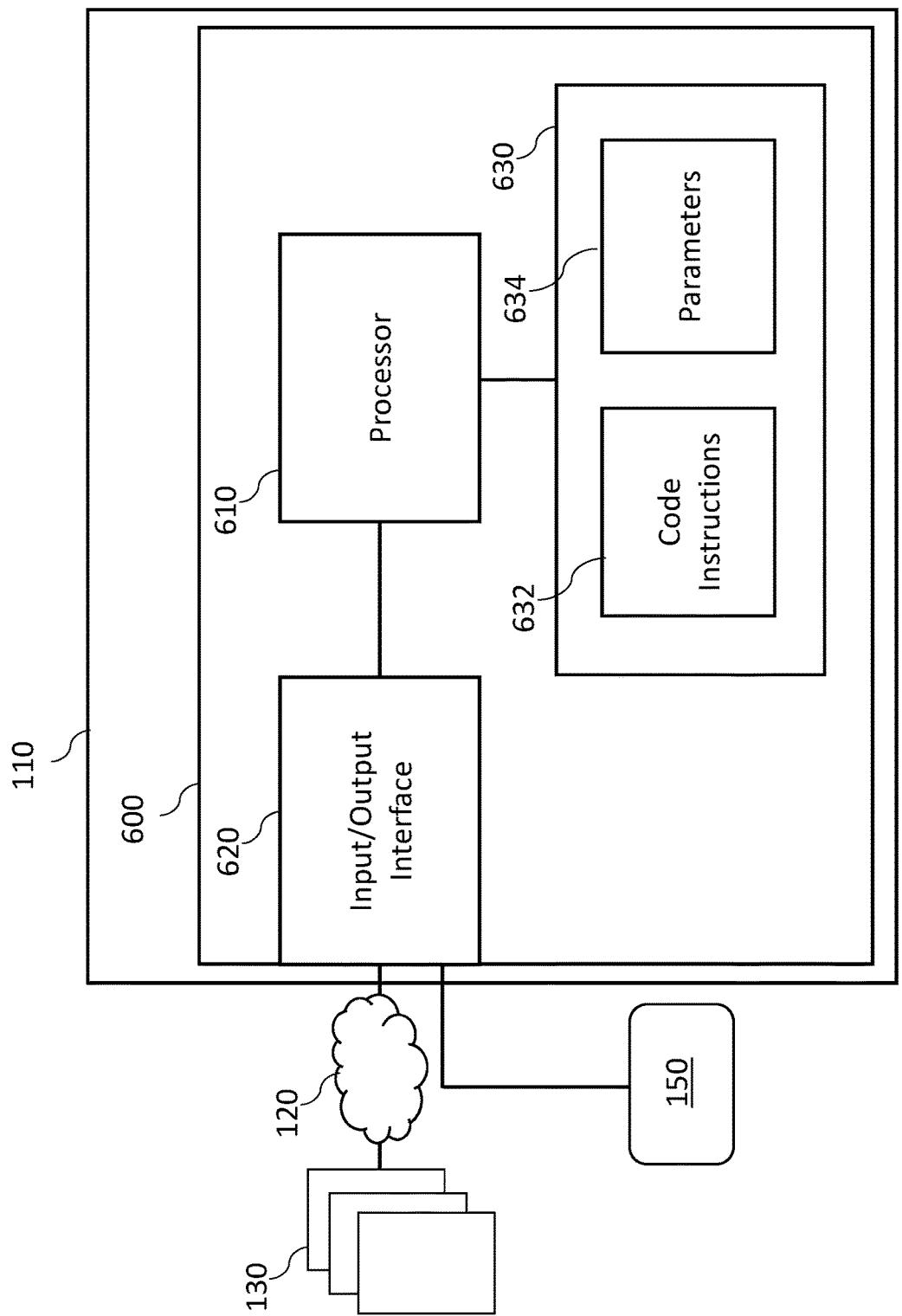
FIG. 6 is a block diagram of a controller for controlling the system of FIG. 1 in accordance with an implementation of the present technology.

With reference to FIG. 5, a method 500 for monitoring configuration status of a plurality of network components of a network, the plurality of network components forming a network configuration of the network, according to some implementations of the present technology is illustrated in the form of a flow chart. In one or more aspects, the method 500 or one or more operations thereof may be performed by the controller 600 (FIG. 6). In some implementations, one of more steps of the method 500 could be implemented, whole or in part, by another computer-implemented device. It is also contemplated that the method 500 or one or more operations thereof may be embodied in computer-executable instructions that are stored in a computer-readable medium, such as a non-transitory mass storage device, loaded into memory and executed by a processor, such as the controller 600. Some operations or portions of operations in the flow diagram may be possibly being executed concurrently, omitted or changed in order.

The method 500 includes generating, at operation 505 and based on the network model 300, the reference configuration file 400 indicative of the expected configuration status of the network components 130. The configuration status may include information about a physical architecture and a virtual architecture of the network for each network components 130. In this embodiment, the network model and/or the reference configuration file 400 may be stored, for example, in a memory 135 (see FIG. 6) of the monitoring entity 110. The reference configuration file 400 may be generated using the network model 300 associating one or more instantiation objects to each one of the plurality of network components 130, the instantiation objects comprising, as described herein above, Node objects, Interface objects, evpnEdge objects and Layer objects.

The reference configuration file 400 includes tagged sections such as section 410, each tagged section comprising one or more tagged sub-sections, such as sub-section 412 and 414, of configuration commands being respective instantiations (e.g. sets of instantiation commands associated with instantiation of the instantiation objects) of one of more instantiation objects of the network model 300 and indicative of the expected configuration status of each of the plurality of network components. In a non-limiting embodiment, the configuration file 400 is generated in response to receiving, by the monitoring entity 110, the monitoring request 152.

In this embodiment, the data format of the configuration file 400 is the JSON format, but other data formats are contemplated in alternative embodiments of the present technology.

The method continues with, at operation 510, receiving the current configuration file 350 indicative of current configuration status of the plurality of network components. In one embodiment, the monitoring entity 110 transmits the configuration status queries 114 to the plurality of network components 130 and generates the current configuration file 350 based on responses to the status queries from the plurality of network components 130. In another embodiment, the monitoring entity receives the current configuration file 350 from the network component 130.

The current configuration file 350 also includes tagged sections, such as sections 360, each tagged section comprising one or more tagged sub-sections, such as sub-sections 362, 364 and 366, of configuration commands indicative of a current configuration status of the network component. As an example, the configuration commands of the current configuration file 350 may be configuration commands that have been previously executed by the network components.

A new current configuration file 350 may be periodically received at a pre-determined rate, such that the latest received current configuration file 350 is representative of an "up-to-date" current network configuration of the network components 130. For example, the monitoring entity 110 may periodically transmit the configuration status query 114 to the network components 130 to, in response to the configuration status query 114, periodically receive "up-to-date" current configuration file 350.

The network may be a multi-tenant network where at least one network component 130 supports a first service and a second service. For example, the first service may be associated with a first client (or first administrator device 150) and the second service may be associated with a second client (or second administrator device 150). As such, functionalities of the at least one network component may be shared between the first and second services. However, the reference and current configuration files 400, 350 are respectively indicative of the expected and current configuration status of the at least one network component for a given one of the first and second services. This may facilitate preservation of data privacy between the first and second clients.

The method 500 continues with, at operation 515, comparing the current configuration file 350 and the reference configuration file 400 by the monitoring entity 110. The monitoring entity 110 may, for example, execute a textual comparison between the configuration files 350 and 400. More specifically, the sub-sections of the current configuration file 350 are textually compared with sub-sections of the configuration file 400 having a same tag. As such, sub-sections comprising configuration commands relative to same characteristics of a same network component 130 are textually compared. In this embodiment, comparing the current configuration file 350 and the reference configuration file 400 includes comparing a first sub-section of the reference configuration file 400 with a corresponding second sub-section of the current configuration file 350 based on tags of the first and second sub-sections, the first and second sub-sections comprising configuration commands relative to one of the plurality of network components 130.

In one embodiment, comparing the configuration files 350 and 400 is performed periodically at a pre-determined rate or in response to an update of one of the configuration files 350 and 400. In the context of the present disclosure, update of a given one of the configuration files 350, 400 may be executed by generating a new given one of one of the configuration files 350, 400.

In at least some embodiments, the method 500 includes a setup phase prior to operation 505, the setup phase comprising receiving a user request for applying a network configuration to the network, generating the network object model 300 of the network configuration through instantiation objects as previously described, each network component being described by one or more corresponding instantiation objects of the network object model, generating one or more configuration instantiating commands based on the user request, each configuration instantiating command being directed to a corresponding network component 130, transmitting, by the monitoring entity 110, the one or more configuration instantiating commands to a corresponding one or more network component of the plurality of network components, and executing the one or more configuration instantiating commands to apply the network configuration to the network.

In at least some embodiments, the method 500 further includes identifying, based on a result of the comparison between the configuration files 350, 400, incoherent configuration commands in sections of the configuration files 350, 400, a configuration commands of a section of the configuration file 400 being identified as incoherent if a corresponding section of the current configuration file 350 lacks the given configuration command, and a configuration commands of a section of the current configuration file 350 being identified as incoherent if a corresponding section of the configuration file 400 lacks the configuration command. In one embodiment, the monitoring entity 110 may generate instructions causing an execution of the incoherent configuration commands of the configuration file 400 onto their corresponding network components 130. Similarly, the monitoring entity 110 may discard incoherent configuration commands from a given sub-section of the current configuration file 350 and execute the configuration commands of the given sub-section on the corresponding network component 130, or execute corrective configuration commands that emulate a discarding of the incoherent configuration commands of the current configuration file 350. In other words, upon being executed by the monitoring entity 110, the corrective configuration commands cause the configuration status of a given network component 130 having a corresponding sub-section of the current configuration file 350 comprising an incoherent configuration command, to match a configuration status described by the other configuration commands of said sub-section without the incoherent configuration command. As such, the current network configuration matches the expected network configuration.

While the above-described implementations have been described and shown with reference to particular steps performed in a particular order, it will be understood that these steps may be combined, sub-divided, or re-ordered without departing from the teachings of the present technology. At least some of the steps may be executed in parallel or in series. Accordingly, the order and grouping of the steps is not a limitation of the present technology.

As an example, FIG. 6 is a schematic block diagram of the controller 600 providing the functionalities of the monitoring entity 110 according to an embodiment of the present technology. The controller 600 includes a processor or a plurality of cooperating processors (represented as a processor 610 for simplicity), a memory device or a plurality of memory devices (represented as a memory device 630 for simplicity), and a input/output interface 620 allowing the controller 600 to communicate with the communication network 120, the plurality of network components 130 communicably connected thereto, and/or administrator devices 150. The processor 610 is operatively connected to the memory device 630 and to the input/output interface 620. The memory device 630 includes a storage for storing parameters 634, including for example and without limitation the current configuration file 350 and the reference configuration file 400. The memory device 630 may include a non-transitory computer-readable medium for storing code instructions 632 that are executable by the processor 610 to allow the controller 600 to perform the various tasks allocated to the controller 600 in the method 500.

The controller 600 is operatively connected, via the input/output interface 620, to the communication network 120 and the administrator devices 150. The controller 600 executes the code instructions 732 stored in the memory device 730 to implement the various above-described functions that may be present in a particular embodiment. FIG. 6 as illustrated represents a non-limiting embodiment in which the controller 600 orchestrates operations of the monitoring entity 110. This particular embodiment is not meant to limit the present disclosure and is provided for illustration purposes.

It should be expressly understood that not all technical effects mentioned herein need to be enjoyed in each and every implementation of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for monitoring a configuration status of a plurality of network components of a network, the method comprising:
   generating, using a network object model associating one or more instantiation objects to each one of the plurality of network components, a first configuration file indicative of an expected configuration status of the plurality of network components, the instantiation objects comprising:
   Node objects representing points of interconnection in the network;
   Interface objects, being hierarchically inferior to the Node objects, and representing connections to points of interconnection;
   evpnEdge objects representing transports to/from points of interconnection in the network; and
   Layer objects, being hierarchically inferior to the evpnEdge objects, and
   representing characteristics of the transported protocol to/from point of interconnection; the first configuration file comprising one or more tagged sections, each tagged section comprising one or more tagged sub-sections, the tagged sections and tagged sub-sections comprising configuration commands being respective instantiations of one or more instantiation objects and indicative of the expected configuration status of each of the plurality of network components;
   receiving a second configuration file indicative of a current configuration status of the plurality of network components, the second configuration file comprising one or more tagged sections, each tagged section comprising one or more tagged sub-sections, the tagged sections and tagged sub-sections comprising configuration commands indicative of the current configuration status of each of the plurality of network components;
   comparing the first and second configuration files comprising comparing a first sub-section of the first configuration file with a corresponding second sub-section of the second configuration file based on tags of the first and second sub-sections, the first and second sub-sections comprising configuration commands relative to one of the plurality of network components;

identifying, based on a result of the comparison between the first and second configuration files, incoherent configuration commands in sub-sections of the first and second configuration files, a given configuration command of a sub-section of the first configuration file being identified as incoherent if a corresponding sub-section of the second configuration file lacks the given configuration command, and a given configuration command of a sub-section of the second configuration file being identified as incoherent if a corresponding sub-section of the first configuration file lacks the given configuration command; and causing, by employing a monitoring entity, an execution of the incoherent configuration commands of the first configuration file by their corresponding network components.

2. The method of claim 1, further comprising, prior to receiving the second configuration file:

transmitting configuration status queries to the plurality of network components; and generating the second configuration file based on responses to the configuration status queries from the plurality of network components.

3. The method of claim 1, further comprising a setup phase prior to generating the first configuration file, the setup phase comprising:

receiving a user request for applying a network configuration to the network;

using the network object model to describe each network component through one or more corresponding instantiation objects of the network object model;

generating one or more configuration instantiating commands based on the user request, each configuration instantiating command being directed to a corresponding network component; transmitting the one or more configuration instantiating commands to a corresponding one or more network component of the plurality of network components; and executing the one or more configuration instantiating commands to apply the network configuration to the network.

4. The method of claim 1, further comprising causing, by the monitoring entity, an execution of corrective configuration commands discarding an incoherent configuration command of a sub-section of the second configuration file from the configuration status of the corresponding network component.

5. The method of claim 1, wherein generating the first configuration file and generating the second configuration file are made in response to receiving a monitoring request by an operator of the network.

6. The method of claim 1, further comprising automatically and periodically updating the second configuration file and comparing the first and second configuration files.

7. The method of claim 1, wherein the network is a multi-tenant network where at least one network component of the plurality of network components supports a first service and a second service, the first and second configuration files being respectively indicative of the expected and current configuration status of the at least one network component for a given one of the first and second services.

8. The method of claim 1, wherein a data format of the first and second configuration files is JSON.

9. The method of claim 1, wherein at least one of the one or more tagged sub-sections of the first configuration file comprises one or more tagged sub-sub-sections.

10. The method of claim 1, wherein at least one of the one or more tagged sub-sections of the second configuration file comprises one or more tagged sub-sub-sections.

11. A system for monitoring a network configuration of a network comprising a plurality of network components, the system comprising a processor and a memory configured to store instructions which, upon being executed by the processor, cause the processor to:

generate, using a network object model associating one or more instantiation objects to each one of the plurality of network components, a first configuration file indicative of an expected configuration status of the plurality of network components, the instantiation objects comprising:

Node objects representing points of interconnection in the network;

Interface objects, being hierarchically inferior to the Node objects, and representing connections to points of interconnection;

evpnEdge objects representing transports to/from points of interconnection in the network; and Layer objects, being hierarchically inferior to the evpnEdge objects, and representing characteristics of the transported protocol to/from point of interconnection, the first configuration file comprising one or more tagged sections, each tagged section comprising one or more tagged sub-sections, the tagged sections and tagged sub-sections comprising configuration commands being respective instantiations of one or more instantiation objects and indicative of the expected configuration status of each of the plurality of network components;

receive a second configuration file indicative of a current configuration status of the plurality of network components, the second configuration file comprising one or more tagged sections, each tagged section comprising one or more tagged sub-sections, the tagged sections and tagged sub-sections comprising configuration commands indicative of the current configuration status of each of the plurality of network components;

compare the first and second configuration files comprising comparing a first sub-section of the first configuration file with a corresponding second sub-section of the second configuration file based on tags of the first and second sub-sections, the first and second sub-sections comprising configuration commands relative to one of the plurality of network components;

identify, based on a result of the comparison between the first and second configuration files, incoherent configuration commands in sub-sections of the first and second configuration files, a given configuration command of a sub-section of the first configuration file being identified as incoherent if a corresponding sub-section of the second configuration file lacks the given configuration command, and a given configuration command of a sub-section of the second configuration file being identified as incoherent if a corresponding sub-section of the first configuration file lacks the given configuration command; and cause, by employing a monitoring entity, an execution of the incoherent configuration commands of the first configuration file by their corresponding network components.

12. The system of claim 11, wherein the processor is further configured to, prior to receiving the second configuration file:
 transmit configuration status queries to the plurality of network components; and
 generate the second configuration file based on responses to the configuration status queries from the plurality of network components.

13. The system of claim 11, wherein the processor is further configured to execute a setup phase prior to generating the first configuration file, the setup phase comprising:
 receiving a user request for applying a network configuration to the network;
 using the network object model to describe each network component through one or more corresponding instantiation objects of the network object model;
 generating one or more configuration instantiating commands based on the user request, each configuration instantiating command being directed to a corresponding network component; transmitting the one or more configuration instantiating commands to a corresponding one or more network component of the plurality of network components; and
 causing execution of the one or more configuration instantiating commands to apply the network configuration to the network.

14. The system of claim 11, wherein the processor is further configured to cause, by employing the monitoring entity, an execution of corrective configuration commands discarding an incoherent configuration command of a sub-section of the second configuration file from the configuration status of the corresponding network component.

15. The system of claim 11, wherein generating, by the processor, the first configuration file and generating the second configuration file are made in response to receiving a monitoring request by an operator of the network.

16. The system of claim 11, wherein the processor is further configured to cause an automatic and periodical update of the second configuration file and compare the first and second configuration files upon receiving an updated second configuration file.

17. The system of claim 11, wherein the network is a multi-tenant network where at least one network component of the plurality of network components supports a first service and a second service, the first and second configuration files being respectively indicative of the expected and current configuration status of the at least one network component for a given one of the first and second services.

18. The system of claim 11, wherein a data format of the first and second configuration files is JSON.

19. The method of claim 1, wherein at least one of the one or more tagged sub-sections of one or more of the first and second configuration files comprises one or more tagged sub-sub-sections.

* * * * *